United States Patent [19]
Johannes

[11] 3,773,017
[45] Nov. 20, 1973

[54] ANIMAL CRATE FOR PICK-UP TRUCKS
[76] Inventor: John H. Johannes, Rt. 1, Robinson, Kans. 66532
[22] Filed: Apr. 27, 1972
[21] Appl. No.: 248,252

[52] U.S. Cl. .................................................. 119/17
[51] Int. Cl. ........................................... A01k 29/00
[58] Field of Search ...................... 119/17, 7, 19, 42, 119/32; 224/42, 46, 29 R; 296/10, 24 C

[56] References Cited
UNITED STATES PATENTS
1,847,425   3/1932   Bartlett .............................. 119/7 X

*Primary Examiner*—Hugh R. Chamblee
*Attorney*—John A. Hamilton

[57] ABSTRACT

An animal crate for use in connection with pick-up trucks, said crate being adapted to be releasably secured to the exterior side of either or both of the stake walls of the bed of said truck so that said stake wall forms one of the walls of said crate, and having novel attaching means adapting it to be affixed to virtually any stake wall, regardless of the width and spacing of the slats of said wall.

6 Claims, 5 Drawing Figures 3,773,017

ANIMAL CRATE FOR PICK-UP TRUCKS

This invention relates to new and useful improvements in animal crates, and has particular reference to an animal crate especially adapted for use in connection with pick-up trucks.

Nearly all farmers, ranchers, and many others, have at least the occasional need to transport small animals, such as calves, pigs or even dogs from place to place, and it would be advantageous to be able to do so by means of pick-up trucks, the use of which is virtually universal. Pick-up trucks, however, are not usually provided with enclosed beds, or any other means for the enclosure or confinement of animals.

The primary object of the present invention, therefore, is the provision of an animal crate especially adapted for use in connection with pick-up trucks.

Another object is the provision of an animal crate of the character described which, although amply large to transport at least as many as four calves or even more smaller animals, does not obstruct the normal cargo space of the truck bed nor reduce the capacity thereof for other cargo.

A further object is the provision of an animal crate of the character described which is adapted to be releasably attached to the exterior side of the ordinary slatted stake wall with which the beds of pick-up trucks are commonly equipped, in such a manner that said stake wall constitutes one of the confining walls of the crate.

A still further object is the provision of an animal crate of the character described in which the means for attaching it to the stake wall is readily adjustable to accommodate the crate for attachment to stake walls in which the width and spacing of the slats may vary over substantial ranges.

Other objects are simplicity and economy of construction, efficiency and dependability of operation, and adaptability for a wide range of usages.

With these objects in view, as well as other objects which will appear in the course of the specification, reference will be had to the accompanying drawings, wherein.

Figure 1:
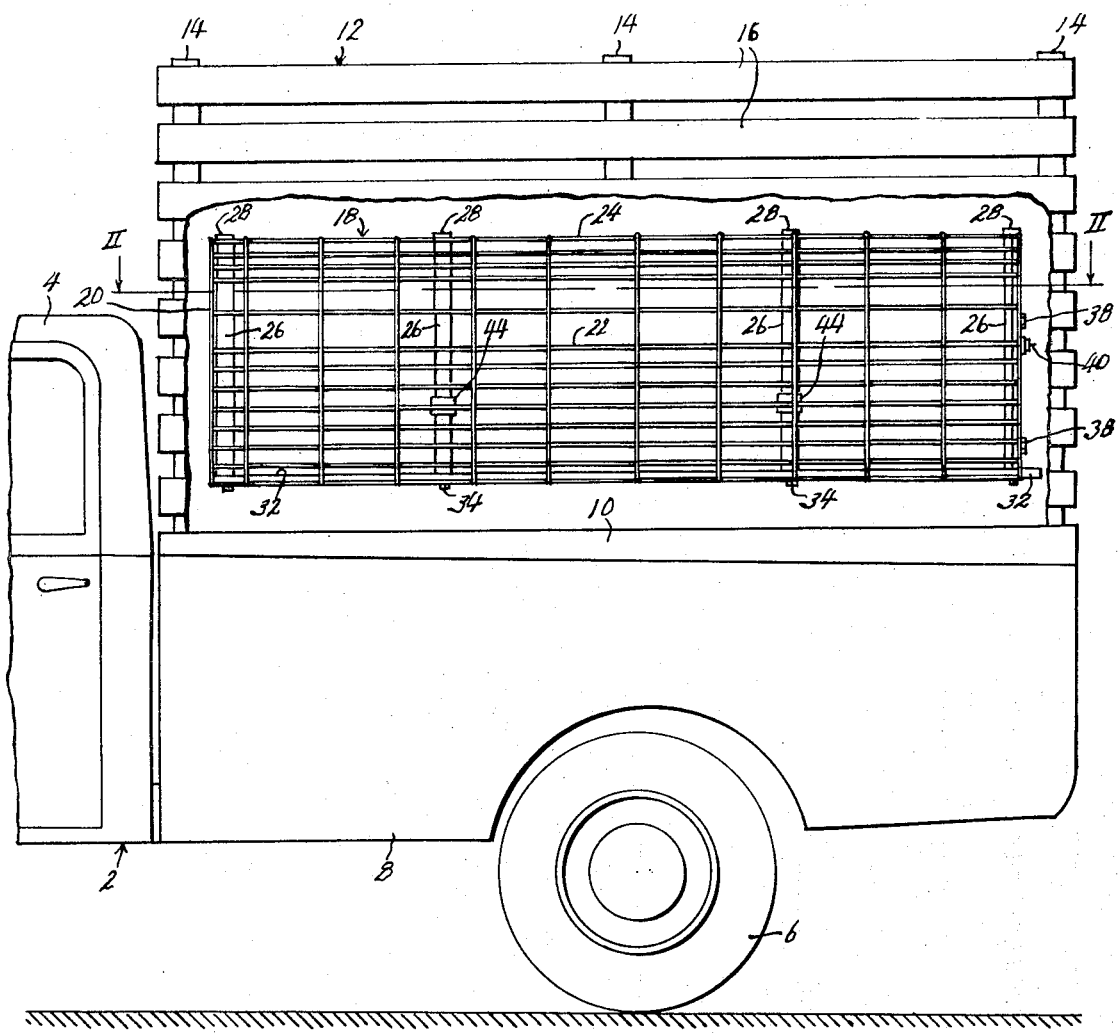
FIG. 1 is a fragmentary side elevational view of a pick-up truck, showing an animal crate embodying the present invention mounted operatively on one of the stake walls thereof, said stake wall being partially broken away to avoid confusion of lines.
Figure 2:
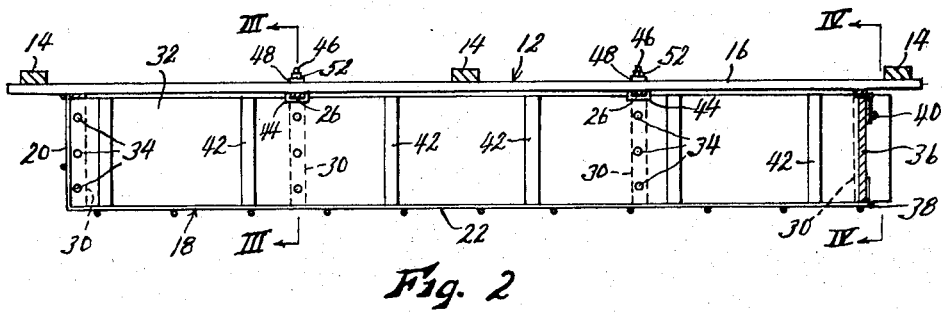
FIG. 2 is a sectional view taken on line II—II of FIG. 1.

Like reference numerals apply to similar parts throughout the several views, and the numeral 2 applies generally to a pick-up truck having a cab 4, rear wheels 6, and a truck bed 8 having upstanding side walls 10, all as standard and well known in the art. Commonly, pick-up truck beds are also furnished with stake walls 12 (one shown), which constitute upward extensions of the side walls 10 of the truck bed. Such stake walls, which are usually removable, are formed of vertical posts or stakes 14 to which are affixed spaced apart, horizontally extending slats 16, and have the primary function of increasing the load capacity of the truck bed. Both the height of such stake walls, as well as the width, spacing and number of the slats 16 thereof, vary widely according to the manufacturer thereof, or according to specialized purposes for which the truck bed is to be used.

Figures 3, 4:
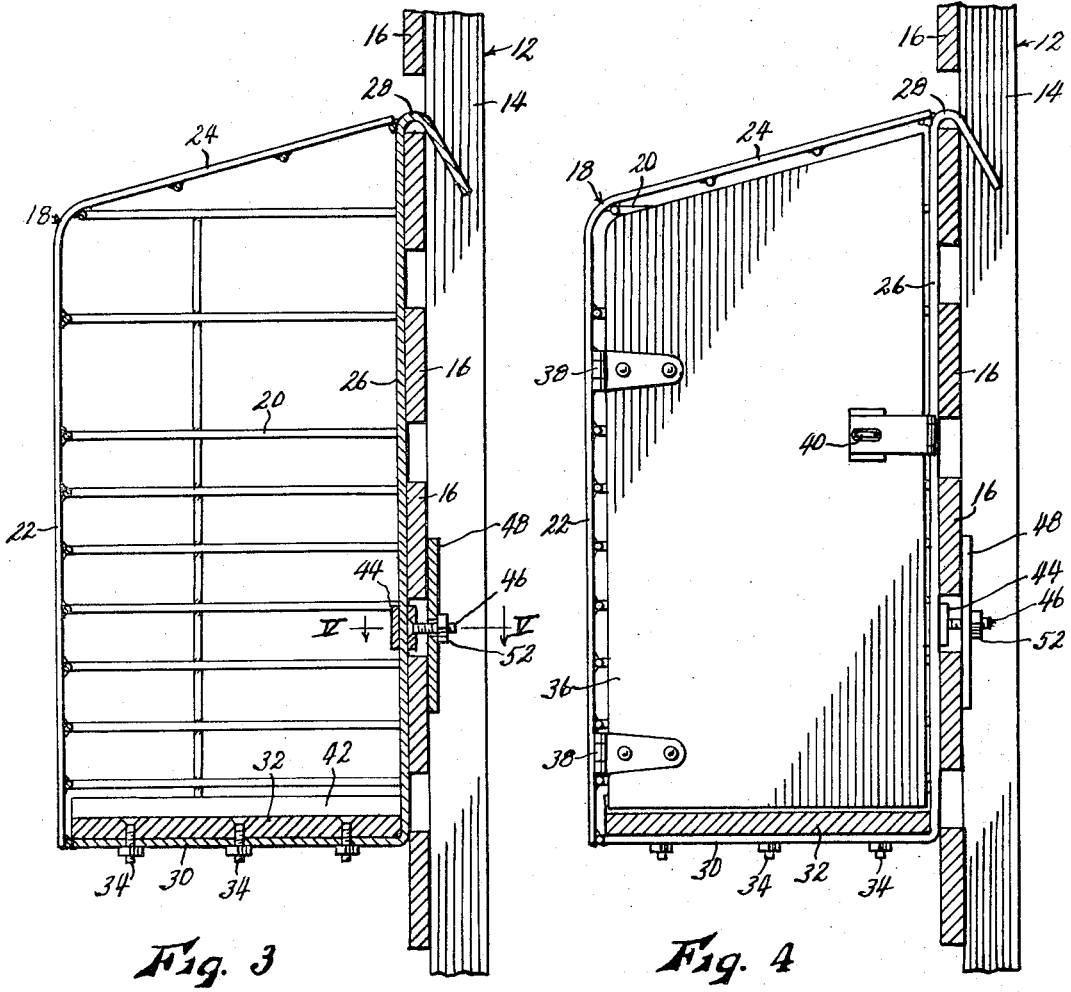
FIG. 3 is an enlarged, fragmentary sectional view taken on line III—III of FIG. 2.
FIG. 4 is an enlarged, fragmentary sectional view taken on line IV—IV of FIG. 2.

An animal crate embodying the present invention is indicated generally by the numeral 18 and is shown attached to the exterior side of stake wall 12. It will be understood that a similar crate may be attached also to the other stake wall of the truck bed. The crate is generally rectilinear in form. The front wall 20, outside vertical wall 22 and top wall 24 thereof constitute open-work grids of rods or bars arranged at right angles and welded at their points of intersection. The spacing of the rods and the size of the openings therebetween may be selected with the size of the animals to be confined therein in mind. The side of the crate toward stake wall 12 is substantially open, being traversed vertically only by a series of strap metal posts 26 spaced along the front-to-rear length of the crate. The inner edge of front crate wall 20 is welded to the foremost of posts 26, and the inner edge of top crate wall 24 is welded to the upper ends of all of said posts. The upper end portion of each post 26 is bent inwardly and downwardly to form a hook 28 which may be inserted between any selected pair of slats 16 to engage the lower of said slats to support the crate, as best shown in FIGS. 3 and 4. Said hook should be sufficiently open that it may be inserted between the stake wall slats even when said slats are quite closely spaced.

At their lower ends, each post 26 is bent outwardly to form a horizontally extending beam 30, which is welded at its outer end to the lower edge of outer crate wall 22. A plank 32, extending the full length of the crate and forming the floor of the crate, is supported by beams 30, and secured thereto by bolts 34. The rearward wall of the crate is formed by a door 36 hinged to outer crate wall 22 at 38, and secured releasably closed by a hasp fastener 40 carried by the rearmost of posts 26. Animals are of course loaded into the crate through its rearward end when door 36 is open and floor 32 is extended somewhat rearwardly beneath said door to facilitate this loading. Also, the floor is supplied with a series of cleats 42 secured to its upper surface at intervals therealong to provide better footing for the animals.

Figure 5:
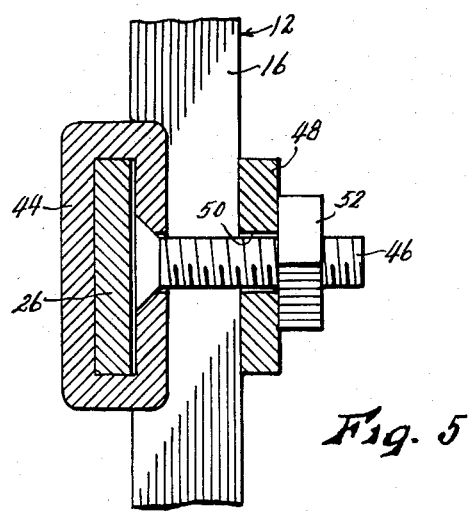
FIG. 5 is an enlarged, fragmentary sectional view taken on line V—V of FIG. 3.

Mounted slidably on at least two of posts 26, for movement upwardly and downwardly therealong is a slide 44. Mounted in the wall of said slide facing stake wall 12 is a horizontal bolt 46 which projects inwardly of said stake wall, between a pair of the slats 16 thereof, as best shown in FIGS. 3 and 5. Mounted rotatably and slidably on said bolt is a crossbar 48, said bolt passing through a hole 50 formed through said crossbar at the midpoint thereof, and said bolt is provided with a nut 52 securing said crossbar thereon. Said crossbar is of a length at least somewhat greater than the vertical spacing between adjacent slats 16.

The crate is mounted on stake wall 12 by first engaging hooks 28 of its posts 26 over the upper edge of a selected one of slats 16 of said wall, the selection being determined by the height at which it may be desired to support the crate. In trucks having high stake walls, it is possible to mount two crates on a single stake wall, in over-and-under relation. Crates may of course be mounted on the stake walls at both sides of the truck. Then the lower edge of each crate is swung outwardly from the stake wall, using hooks 28 as pivots, and slides 44 are adjusted vertically on posts 26 until bolts 46 and cross-bars 48 turned into parallel relation with slats 16, can pass inwardly between some adjacent pair of said slats, preferably as close as possible to the bottom of the crate. Crossbars 48 are then turned crosswise of slats 16, to overlie the inner surfaces of adjacent slats 16, and nuts 52 are tightened to clamp said crossbars firmly in place. This clamping action serves not only to prevent any outward movement of the bottom of the crate from the stake wall, but also to prevent any bodily upward movement of the crate relative to the stake wall, which could occur due to bouncing of the truck on rough roads, and which might otherwise cause disengagement of hooks 28 from the stake wall. The vertical adjustment of slides 44 on posts 26 is necessitated, if the crate is to have universal applicability to virtually any stake wall, by the fact that the width and spacing of the slats in various stake walls is far from standardized, and varies widely.

Thus it will be apparent that an animal crate having several advantages has been produced. With a length of about 7 feet, a width of about one foot, and an average height of about 2 feet, as presently contemplated, it can transport at least two calves, or a larger number of smaller animals. At the same time, crates can be mounted on the exterior sides of both stake walls of a standard pick-up truck the bed of which is 6 feet wide, without exceeding the maximum vehicle width of 8 feet permitted by the highway regulations of most states. The crates do not occupy or obstruct the normal cargo space of the truck, nor hinder access thereto. The crates utilize the truck stake walls as operative walls of the crates themselves, and are universally adaptable for mounting on virtually any stake wall. They may be easily mounted or demounted, according to whether their use is or is not desired at any particular time, and require no alteration or modification whatsoever of the stake walls or any other portion of the truck itself.

Although I have shown and described a specific embodiment of my invention, it will be readily apparent that many minor changes of structure and operation could be made without departing from the spirit of the invention.

What I claim as new and desire to protect by Letters Patent is:

1. An animal crate for use in combination with a pick-up truck having a bed equipped with stake walls, said crate comprising:
    a. walls defining a hollow, generally rectilinear crate adapted to be disposed adjacent and contacting the exterior surface of a stake wall of said truck, and
    b. attaching means carried by said crate and operable to secure said crate to said stake wall, whereby said crate is disposed exteriorly to the bed of said truck, said stake wall including horizontally extending spaced apart slats, and said attaching means including a plurality of bolts carried by said crate and projecting horizontally therefrom to extend between adjacent pairs of the slats of said stake wall to the interior side of said wall, and an enlargement carried by each of said bolts and operable to engage clampingly the interior surfaces of the slats adjacent said bolt.

2. An animal crate as recited in claim 1 wherein said enlargement comprises a crossbar arranged normally to said bolt and being slidable and rotatable thereon, said crossbar having a width less than the spacing between said stake wall slats and a length greater than said spacing, and with the addition of a nut threaded on said bolt at the side of said crossbar opposite from said crate.

3. An animal crate as recited in claim 1 with the addition of a plurality of slides carried by said crate for free vertical movement relative thereto, each of said bolts being carried by one of said slides.

4. An animal crate as recited in claim 3 wherein said attaching means additionally includes a plurality of downwardly opening hooks rigidly affixed to said crate and operable to engage downwardly over the upper edge of a slat of said stake wall.

5. An animal crate as recited in claim 4 wherein the side of said crate adjacent said stake wall is substantially open, whereby when said crate is secured to said stake wall by said attaching means, said stake wall forms an effective closure wall for the open side of said crate.

6. An animal crate as recited in claim 1 having openwork front, top and outer side walls, a solid floor, and a hinged, lockable door forming the rear wall thereof, the inner side thereof being substantially open, said attaching means being operable to secure said crate to said stake wall with its open side against said stake wall, said attaching means additionally including:
    a. a plurality of vertical posts forming fixed elements of said crate and traversing the open side thereof,
    b. downwardly opening hooks formed by said posts at the upper ends thereof and operable to engage downwardly over the upper edge of one of the stake wall slots,
    c. a slide carried by each of certain of said posts for vertical movement thereon, each of said bolts being affixed to one of said slides, and wherein the enlargement carried by each of said bolts comprises
    d. a crossbar mounted slidably and rotatably on said bolt, the width and length of said crossbar being respectively less than and greater than the vertical spacing between said adjacent slots, and
    e. a nut threaded on said bolt outwardly from its associated crossbar.

* * * * *